United States Patent
Lee et al.

(10) Patent No.: US 9,073,591 B2
(45) Date of Patent: Jul. 7, 2015

(54) BICYCLE PARKING APPARATUS

(76) Inventors: Kyu Seul Lee, Yongin-si (KR); Seong Pyo Lee, Yongin-si (KR)

( * ) Notice: Subject to any disclaimer, the term of this patent is extended or adjusted under 35 U.S.C. 154(b) by 420 days.

(21) Appl. No.: 13/387,874

(22) PCT Filed: May 11, 2010

(86) PCT No.: PCT/KR2010/002975
§ 371 (c)(1),
(2), (4) Date: Jan. 30, 2012

(87) PCT Pub. No.: WO2011/013896
PCT Pub. Date: Feb. 3, 2011

(65) Prior Publication Data
US 2012/0128453 A1 May 24, 2012

(30) Foreign Application Priority Data

Jul. 31, 2009 (KR) .................. 10-2009-0070472

(51) Int. Cl.
*E04H 6/00* (2006.01)
*B62H 3/00* (2006.01)

(52) U.S. Cl.
CPC . *B62H 3/00* (2013.01); *E04H 6/005* (2013.01)

(58) Field of Classification Search
CPC ..................................................... E04H 6/005
USPC .......... 414/232, 263, 227, 234, 239, 236, 252
See application file for complete search history.

(56) References Cited

U.S. PATENT DOCUMENTS

| | | | | |
|---|---|---|---|---|
| 3,672,517 A * | 6/1972 | Salloum | ......................... | 414/228 |
| 6,004,091 A * | 12/1999 | Roth | ............................. | 414/263 |
| 2002/0057021 A1* | 5/2002 | Tanaka et al. | ................. | 307/116 |
| 2002/0146305 A1* | 10/2002 | Haag | ............................. | 414/228 |
| 2005/0074314 A1* | 4/2005 | Hart et al. | ..................... | 414/234 |

FOREIGN PATENT DOCUMENTS

| | | |
|---|---|---|
| EP | 0631027 A2 | 12/1994 |
| JP | 09328923 | 12/1997 |
| JP | 10-148042 | 6/1998 |
| JP | 10-331472 | 12/1998 |

(Continued)

OTHER PUBLICATIONS

European Patent Application No. 10804609.5, Extended European Search Report dated Mar. 6, 2013. 6 pages.

(Continued)

*Primary Examiner* — Saul Rodriguez
*Assistant Examiner* — Willie Berry, Jr.
(74) *Attorney, Agent, or Firm* — Schmeiser, Olsen & Watts, LLP

(57) ABSTRACT

The invention relates to a bicycle parking apparatus. The disclosed bicycle parking apparatus comprises: a rotational driving member providing driving power; a rotating storage unit consisting of multiple levels, rotated by the driving power from the rotational driving member, and partitioned so as to store bicycles in a radial configuration; an elevating unit, provided at a peripheral side of the rotating storage unit, for raising and lowering loaded bicycles; and a loading/unloading unit, provided at the elevating unit, for grasping and loading a bicycle from the outside onto the elevating unit or unloading a bicycle from the elevating unit to the outside.

10 Claims, 16 Drawing Sheets

(56) References Cited

FOREIGN PATENT DOCUMENTS

| | | |
|---|---|---|
| JP | 2000-248771 | 9/2000 |
| JP | 2006-142968 | 6/2006 |
| JP | 2008-062750 | 3/2008 |
| KR | 100880011 B1 | 1/2009 |

OTHER PUBLICATIONS

Korean Patent Application No. 10-2009-0070472, Office Action issued Nov. 18, 2009. 4 pages.

* cited by examiner

BICYCLE PARKING APPARATUS

TECHNICAL FIELD

The present invention relates to a bicycle parking apparatus and, more particularly, to a bicycle parking apparatus, which may minimize a land area for parking bicycles through optimized storage efficiency of bicycles, prevent burglary and damage of bicycles, and provide user convenience through automation of loading and unloading of bicycles.

BACKGROUND ART

Recently, bicycles have been increasingly used for movement over short distance due to an increase in the amount of traffic causing severe traffic jams and environmental pollution.

In addition, a "bicycle riding movement" is promoted as a method for "low carbon green growth" in some countries.

Bicycles are transportation means that do not cause environmental pollution and are conducive to user health. Further, bicycles permit effective use of a road and effective movement of individuals even on a congested road.

Accordingly, use of bicycles is actively promoted by many countries and civil society organizations, and it becomes a main issue to provide bicycle storage facilities, which can store bicycles without a likelihood of burglary or damage, to stations, terminals, department stores, public facilities, and residential facilities such as apartment complexes in order to achieve a successful result of the bicycle riding movement.

DISCLOSURE

Technical Problem

Most conventional bicycle parking platforms are configured to tie bicycles using locks to prevent burglary of the bicycles, and thus users must inconveniently carry locks and keys.

Further, since such a conventional bicycle parking platform is installed in a limited space due to a difficulty in securing a bicycle parking land area for storing bicycles, the conventional bicycle parking platform cannot accommodate a large number of bicycles and stores bicycles in an exposed state such that the bicycles are likely to be damaged or stolen.

Moreover, the conventional bicycle parking platform requires a user to put and take a bicycle into and from the bicycle parking platform and causes inconvenience due to a narrow space.

Therefore, there is a need to solve such problems.

The present invention is conceived to solve such problems in the art and is directed to providing a bicycle parking apparatus, which includes a disk-shaped rotational storage unit constituted by multiple layers and configured to store bicycles in a radial arrangement in order to minimize a land area for bicycle parking through optimized storage efficiency, to prevent burglary and damage of bicycles, and to provide user convenience through automation of loading or unloading of bicycles.

Technical Solution

In accordance with one aspect of the present invention, a bicycle parking apparatus includes: a rotational driving unit supplying power; a rotational storage unit constituted by multiple layers, rotated by power from the rotational driving unit, and partitioned into bicycle storing sections to store bicycles in a radial arrangement; an elevation unit disposed at a peripheral side of the rotational storage unit to raise of lower a bicycle thereon; and a loading/unloading unit provided to the elevation unit and holding a bicycle to load the bicycle from outside onto the elevation unit or to unload the bicycle from the elevation unit to the outside.

A plurality of rotational storage units may be arranged around the elevation unit, and the elevation unit may be provided with a storage direction changing unit which rotates the elevation unit to change a storage direction of a bicycle.

The elevation unit may include a carrying board on which a bicycle is loaded, a guide member extending in a vertical direction to guide the carrying board to move in the vertical direction, and an elevation power transfer member connected to the carrying board and supplying power for moving the carrying board along the guide member in the vertical direction.

The storage direction changing unit may include a plate supporting the elevation unit, a support column to which the plate is rotatably coupled and which supports the plate with respect to the outside, and a rotational power transfer member supplying power for rotating the plate on the support column.

The elevation unit may be provided at a front side thereof with a holding unit for holding a bicycle while the bicycle is loaded on the elevation unit or unloaded therefrom.

The holding unit may include a base, a holding gripper provided to the base and compressing a rear wheel of a bicycle to secure the bicycle, and a receiving hole formed on the base to partially receive a front wheel of the bicycle.

The apparatus may further include a cover member disposed below the receiving hole to selectively cover the receiving hole to prevent the rear wheel of the bicycle from falling into the receiving hole while the bicycle is loaded.

The loading/unloading unit may include a transfer bracket coupled to the carrying board to move horizontally on the elevation unit, a slide driving unit supplying power for horizontally moving the transfer bracket on the elevation unit, a pair of grippers coupled to the transfer bracket to move in a width direction of the transfer bracket, and a grip driving unit providing compressive force to cause the pair of grippers to move in the width direction of the transfer bracket and to selectively compress the bicycle at both sides thereof.

The rotational storage unit may be provided with a securing unit which secures a bicycle stored therein.

The securing unit may include a guide rail disposed on a bottom of the rotational storage unit to guide a wheel of a bicycle, and a holder provided to the guide rail to selectively compress the wheel of the bicycle at both sides of the wheel.

The holder may include a pair of hinge brackets longitudinally separated from each other and hingeably coupled to opposite sides of the guide rail to be symmetrical to each other, a support roller rotatably coupled to each end of the hinge brackets to connect the pair of hinge brackets, and a tension spring connecting the hinge brackets to each other to maintain an initial state of the hinge brackets symmetrically disposed at the opposite sides of the guide rail.

The apparatus may further include a double receiving prevention unit in each of the elevation unit and the rotational storage unit to prevent each of the partitioned bicycle storing sections of the rotational storage unit from receiving two bicycles when a bicycle is supplied from the elevation unit into the rotational storage unit.

The double receiving prevention unit may include a mirror reflection sensor provided to the elevation unit and a reflection mirror provided to the rotational storage unit and disposed to face the mirror reflection sensor.

Advantageous Effects

According to exemplary embodiments of the invention, the bicycle parking apparatus includes a disk-shaped rotational storage unit constituted by multiple layers to store bicycles in a radial arrangement, thereby minimizing a land area for parking bicycles through improved bicycle storage efficiency.

In addition, in the bicycle parking apparatus according to the embodiments of the invention, bicycles may be safely stored in a case, thereby preventing burglary and damage of the bicycles, and providing user convenience through automation of storage and unloading of the bicycles.

Further, the bicycle parking apparatus allows a plurality of rotational storage units to be arranged around a single elevation unit, thereby facilitating an increase in the number of bicycles to be stored.

Furthermore, the double receiving prevention unit may be provided to each of the rotational storage unit and the elevation unit to prevent each of partitioned bicycle storing sections of the rotational storage unit from receiving two bicycles, and the securing unit may be provided to the rotation preventing unit to prevent a loaded bicycle from falling during rotation of the rotation preventing unit, so that the apparatus can be prevented from malfunctioning and bicycles stored in the apparatus can be prevented from being damaged, thereby improving reliability.

Figure 1:
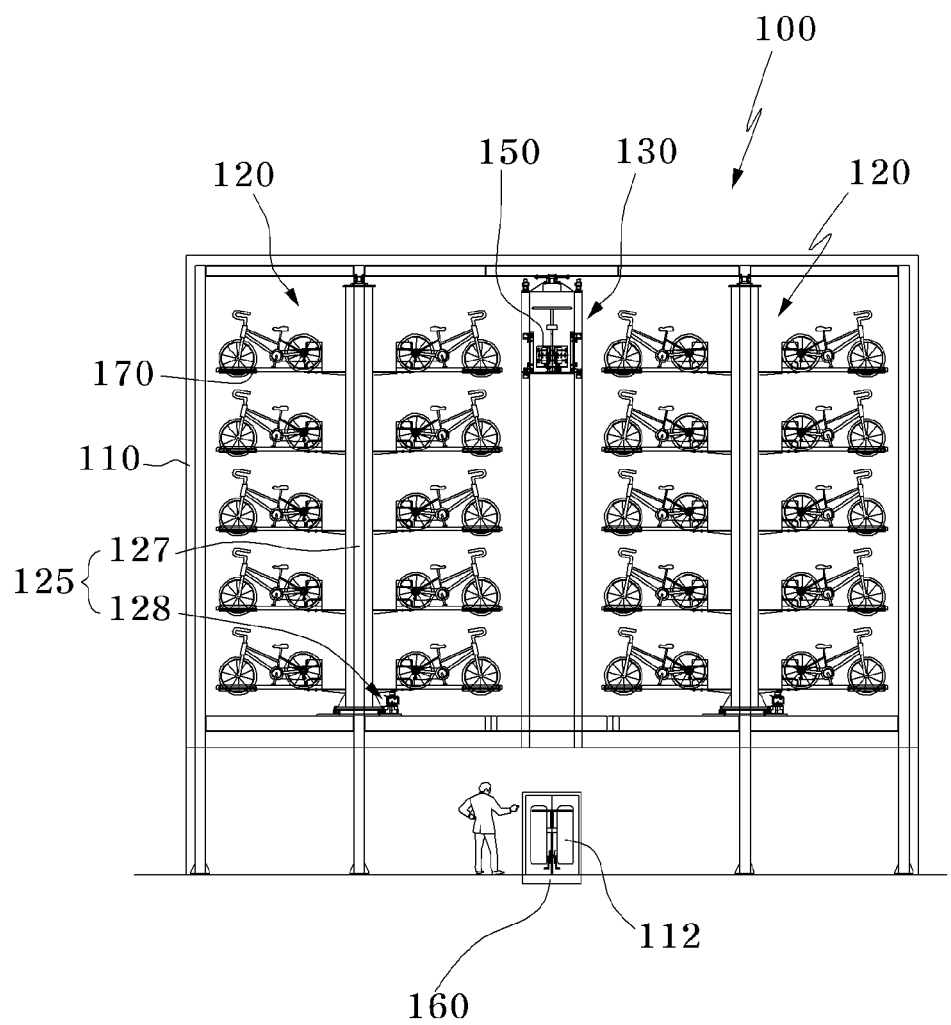
FIG. 1 is a front view of a bicycle parking apparatus according to one exemplary embodiment of the present invention.

<Description of reference numerals of main parts of the drawings>

| | |
|---|---|
| 100: bicycle parking apparatus | 110: case |
| 120: rotational storage units | 125: rotational driving unit |
| 127: support shaft | 128: rotational driving member |
| 130: elevation unit | 132: carrying board |
| 132a: guide groove | 134: guide member |
| 135: elevation power transfer member | |
| 140: storage direction changing unit | |
| 142: plate | 144: support column |
| 145: rotational power transfer member | 150: loading/unloading unit |
| 152: transfer bracket | 154: slide driving unit |
| 156: gripper | 158: grip driving unit |
| 160: holding unit | 162: base |
| 164: holding gripper | 166: receiving hole |
| 165: cover member | 170: securing unit |
| 171: guide | 172: guide rail |
| 175: holder | 176: hinge bracket |
| 177: support roller | 178: tension spring |
| 180: double receiving prevention unit | 182: mirror reflection sensor |
| 184: reflection mirror | |

BEST MODE

Exemplary embodiments of the present invention will now be described in detail with reference to the accompanying drawings. It should be noted that the drawings are not to precise scale and may be exaggerated in thickness of lines or size of components for descriptive convenience and clarity only. Furthermore, the terms used herein are defined by taking functions of the present disclosure into account and can be changed according to user or operator's custom or intention. Therefore, definition of the terms should be made according to the overall disclosure set forth herein.

Figure 2:
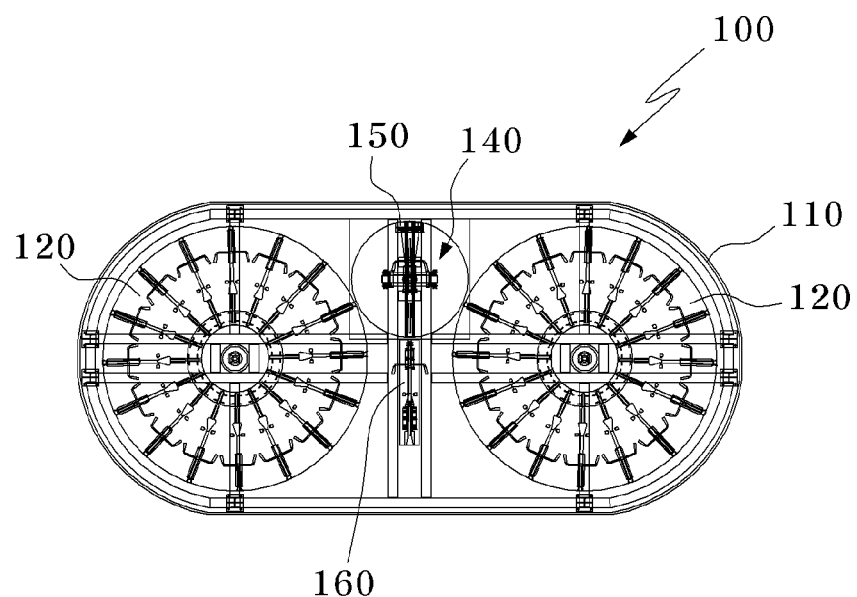
FIG. 2 is a plan view of the bicycle parking apparatus according to the exemplary embodiment of the present invention.
Figure 3:
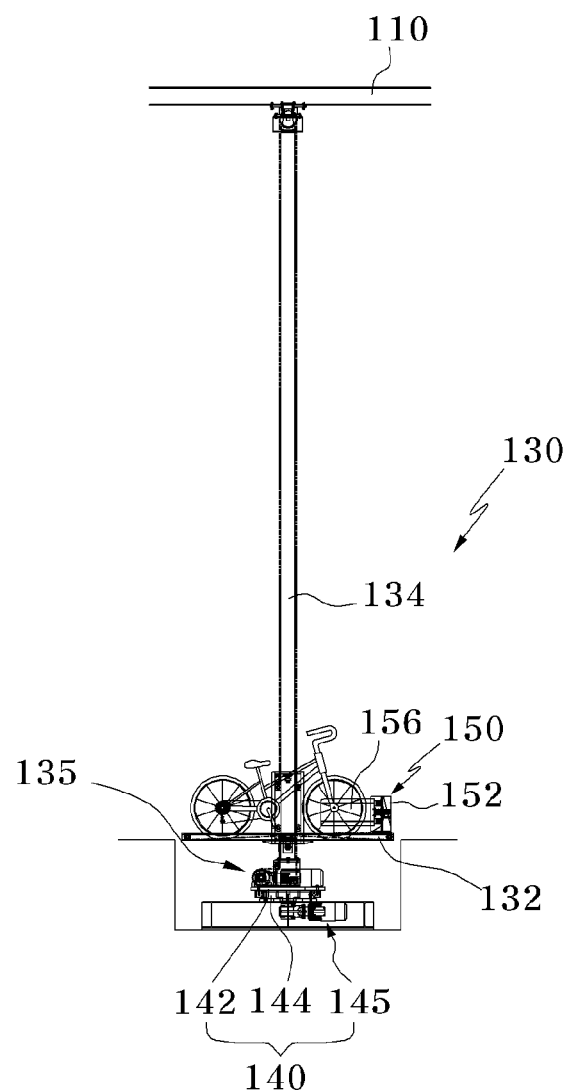
FIG. 3 is a front view of an elevation unit of the bicycle parking apparatus according to the exemplary embodiment of the present invention.
Figure 4:
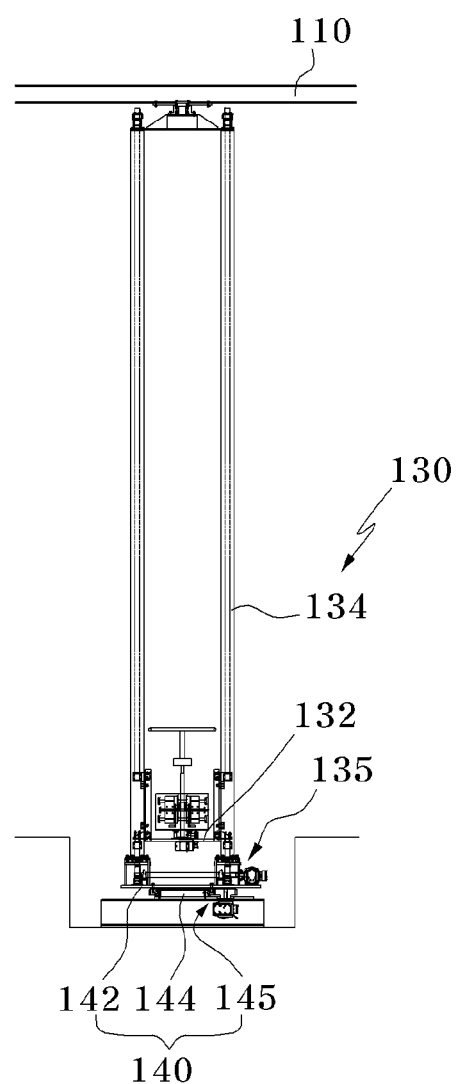
FIG. 4 is a side sectional view of the elevation unit of the bicycle parking apparatus according to the exemplary embodiment of the present invention.
Figure 5:
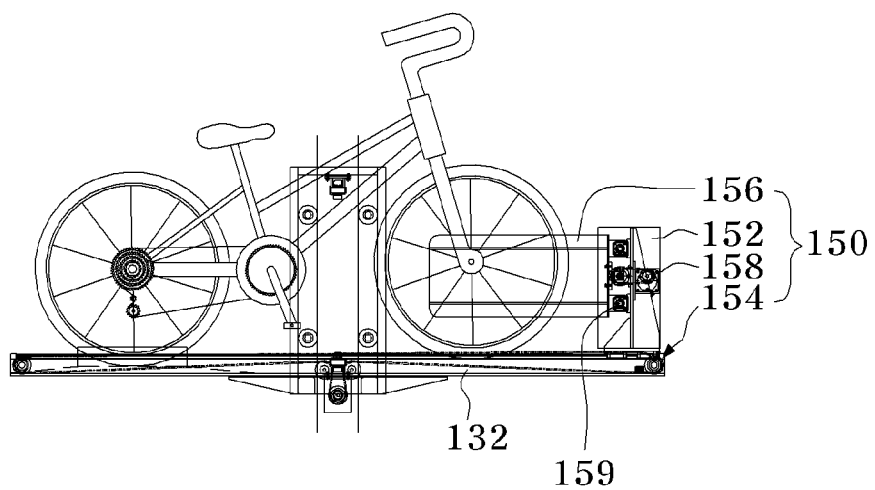
FIG. 5 is a front view of a loading/unloading unit of the bicycle parking apparatus according to the exemplary embodiment of the present invention.
Figure 6:
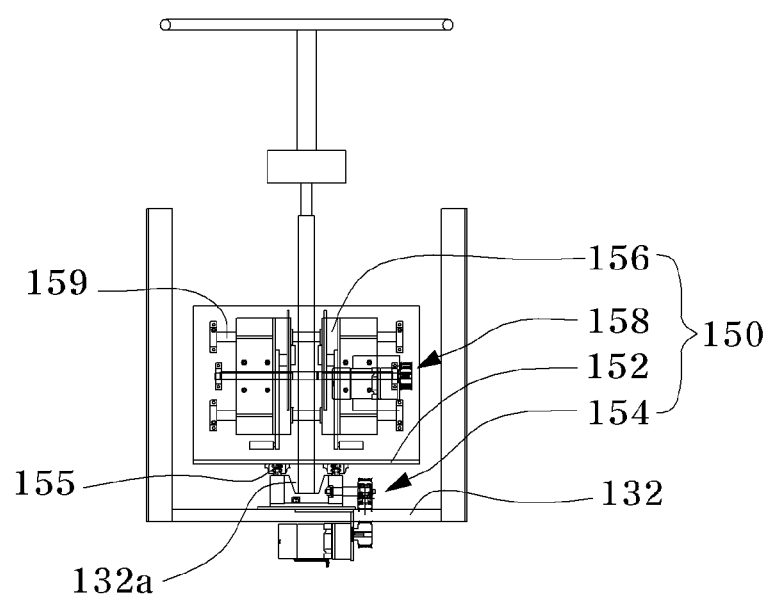
FIG. 6 is a side sectional view of the loading/unloading unit of the bicycle parking apparatus according to the exemplary embodiment of the present invention.
Figure 7:
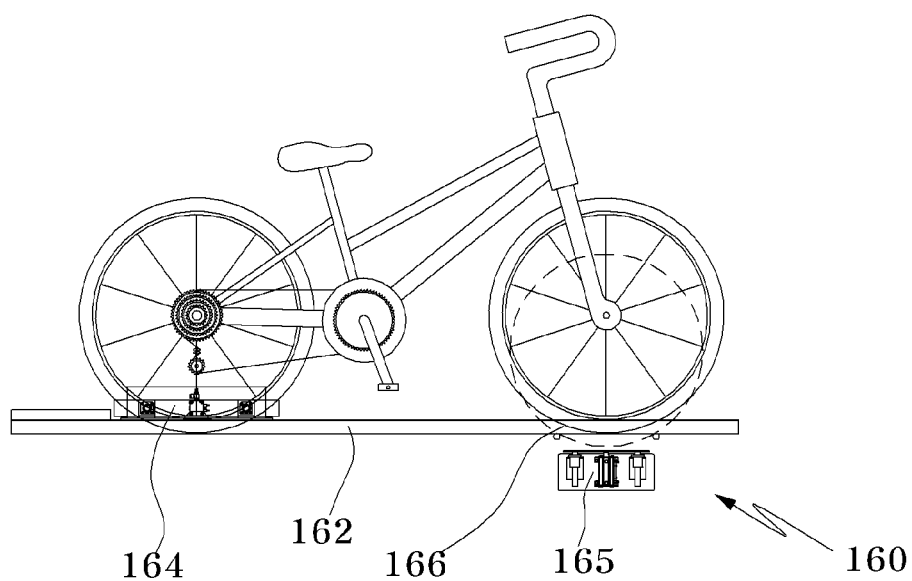
FIG. 7 is a front view of a holding unit of the bicycle parking apparatus according to the exemplary embodiment of the present invention.
Figure 8:
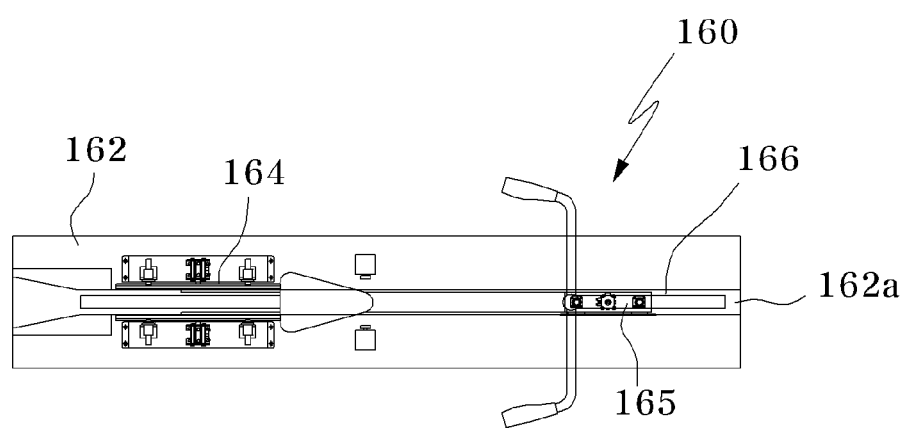
FIG. 8 is a plan view of the holding unit of the bicycle parking apparatus according to the exemplary embodiment of the present invention.
Figure 9:
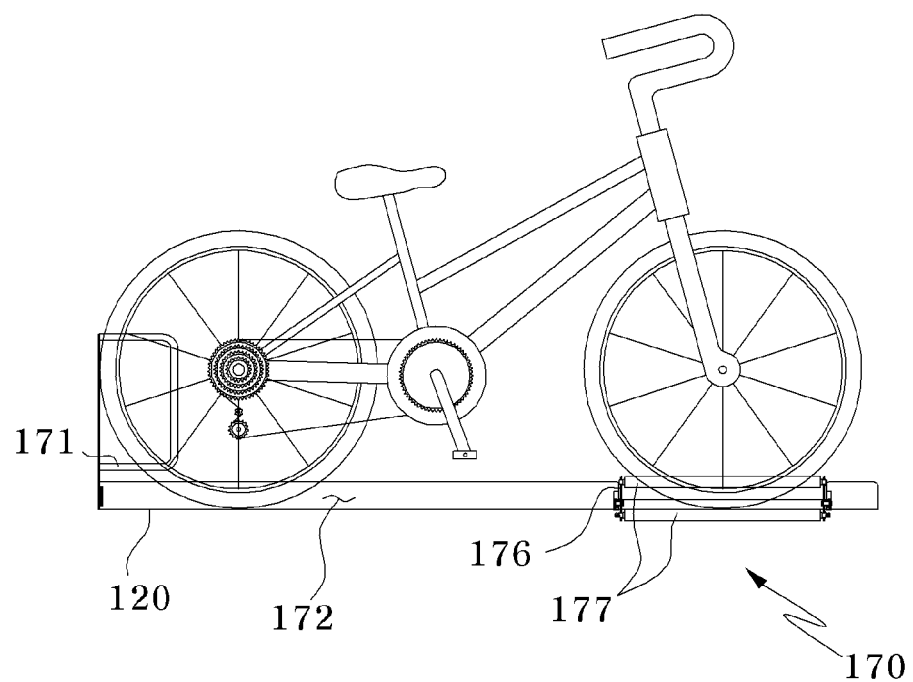
FIG. 9 is a front view of a securing unit of the bicycle parking apparatus according to the exemplary embodiment of the present invention.
Figure 10:
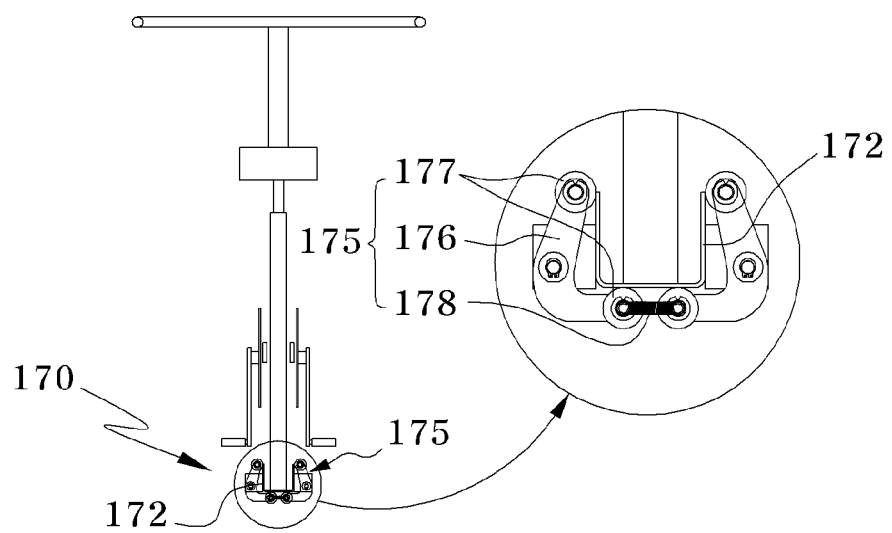
FIG. 10 is a side view of the securing unit of the bicycle parking apparatus according to the exemplary embodiment of the present invention.
Figure 11:
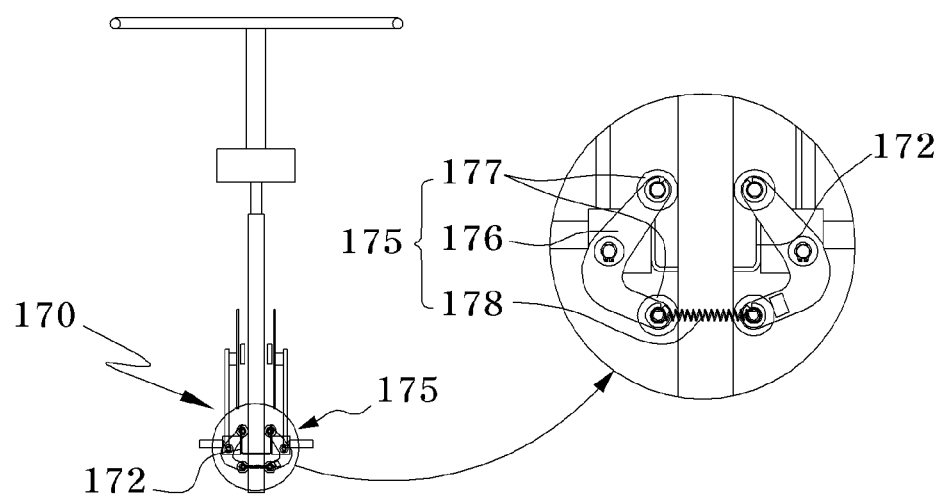
FIG. 11 is a view of the securing unit of the bicycle parking apparatus according to the exemplary embodiment of the present invention in operation.
Figure 12:
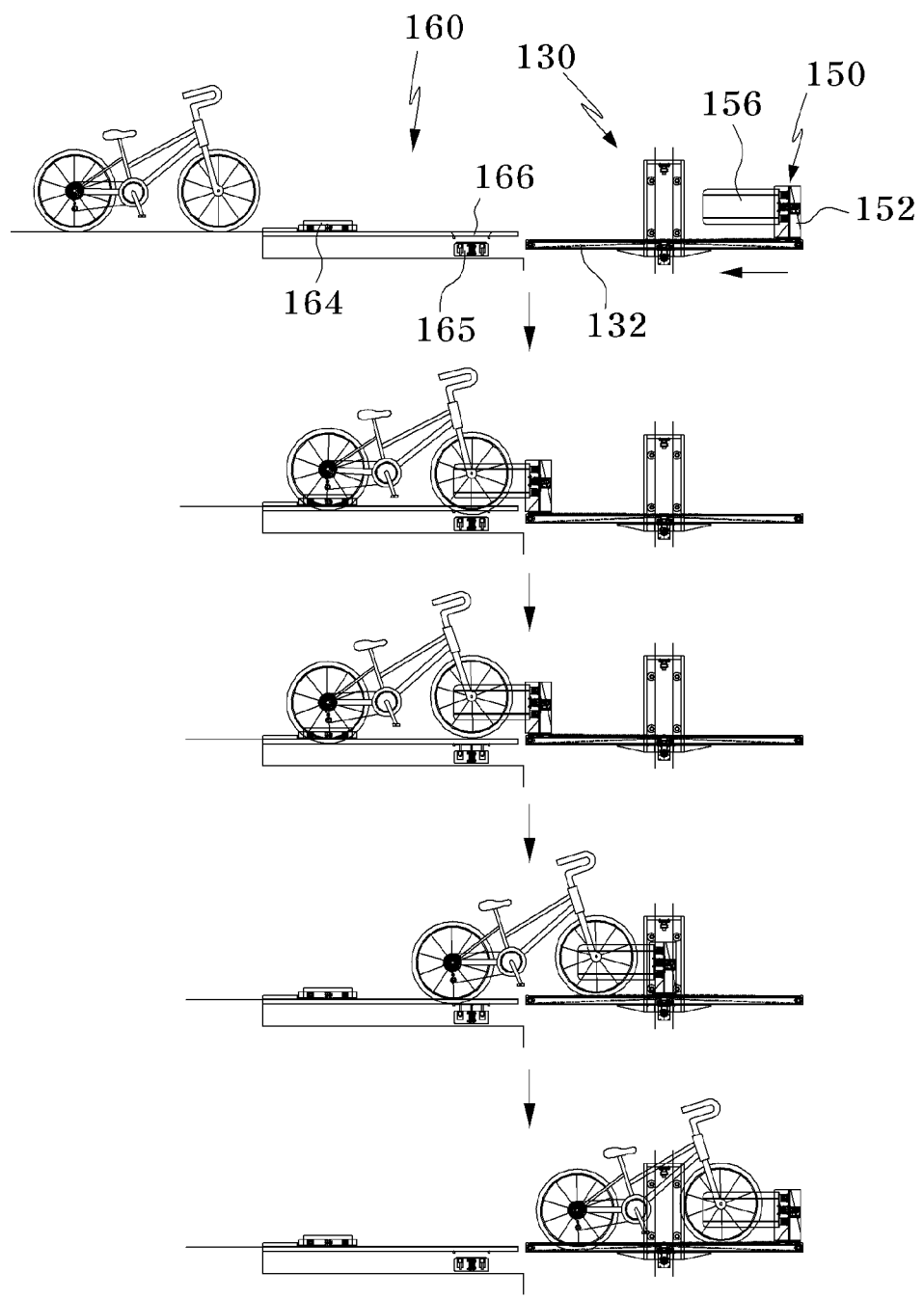
FIG. 12 is a view of the bicycle parking apparatus according to the exemplary embodiment of the present invention upon loading of a bicycle.
Figure 13:
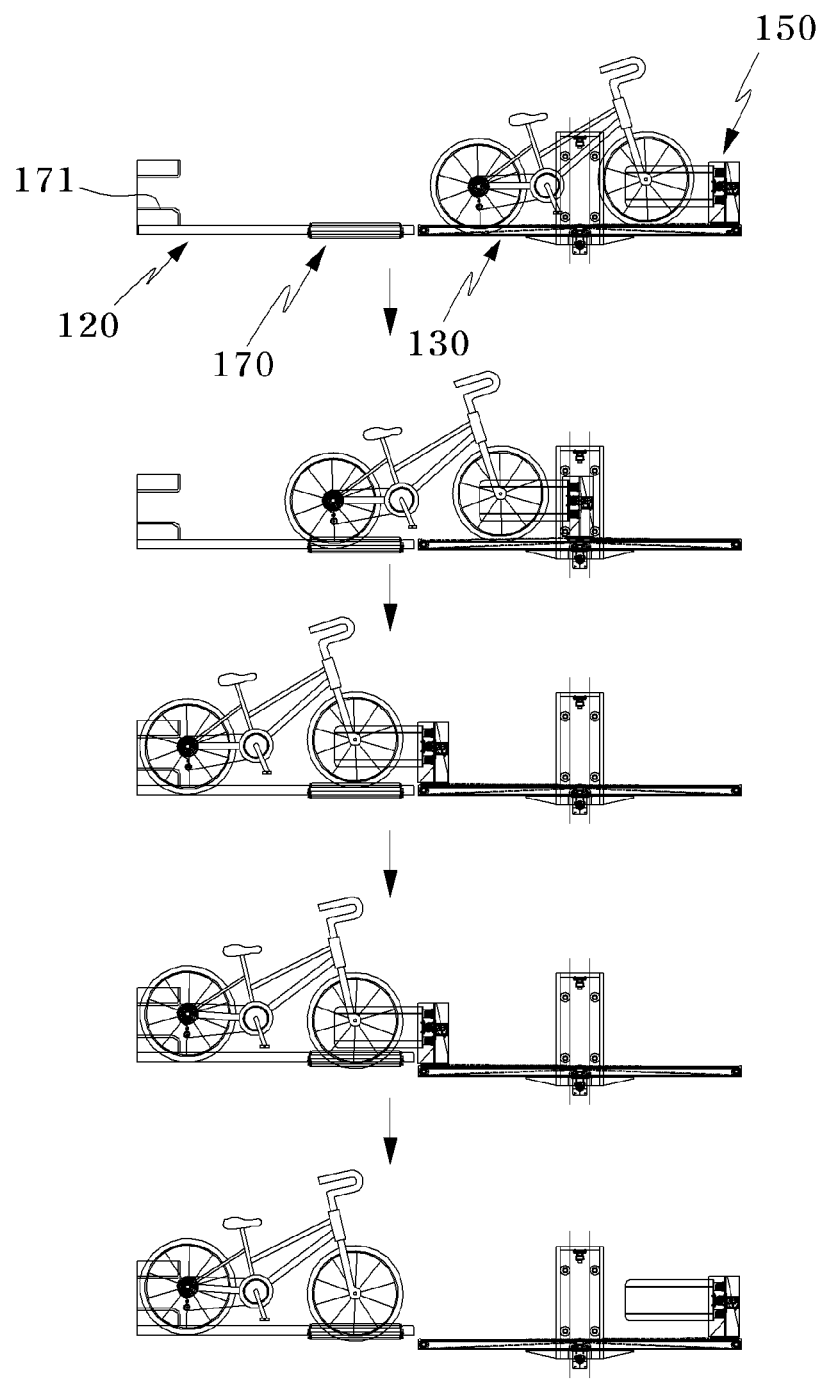
FIG. 13 is a view of the bicycle parking apparatus according to the exemplary embodiment of the present invention during storage of a bicycle.

FIG. 1 is a front view of a bicycle parking apparatus according to one exemplary embodiment; FIG. 2 is a plan view of the bicycle parking apparatus according to the exemplary embodiment; FIG. 3 is a front view of an elevation unit of the bicycle parking apparatus according to the exemplary embodiment; FIG. 4 is a side sectional view of the elevation unit of the bicycle parking apparatus according to the exemplary embodiment; FIG. 5 is a front view of a loading/unloading unit of the bicycle parking apparatus according to the exemplary embodiment; FIG. 6 is a side sectional view of the loading/unloading unit of the bicycle parking apparatus according to the exemplary embodiment; FIG. 7 is a front view of a holding unit of the bicycle parking apparatus according to the exemplary embodiment; FIG. 8 is a plan view of the holding unit of the bicycle parking apparatus according to the exemplary embodiment; FIG. 9 is a front view of a securing unit of the bicycle parking apparatus according to the exemplary embodiment; FIG. 10 is a side view of the securing unit of the bicycle parking apparatus according to the exemplary embodiment; FIG. 11 is a view of the securing unit of the bicycle parking apparatus according to the exemplary embodiment in operation; FIG. 12 is a view of the bicycle parking apparatus according to the exemplary embodiment upon loading of a bicycle; and FIG. 13 is a view of the bicycle parking apparatus according to the exemplary embodiment during storage of a bicycle.

As shown in these drawings, the bicycle parking apparatus 100 according to the exemplary embodiment generally includes a case 110, rotational storage units 120, an elevation unit 130, and a loading/unloading unit 150.

The case 110 defines an inner space which accommodates the rotational storage units 120 and the elevation unit 130, and is provided with an inlet/outlet section 112 through which a bicycle is loaded to or unloaded from the elevation unit 130.

The inlet/outlet section 112 is provided with an automatic door which is automatically opened or closed upon loading/unloading of bicycles.

Each of the rotational storage units 120 is rotated by power from the rotational driving unit 125, partitioned into bicycle storing sections to store bicycles in a radial arrangement, and constituted by multiple layers.

The rotational driving unit 125 includes a support shaft 127 to which the rotational storage units 120 are rotatably coupled and which is secured to upper and lower sides of the case 110, and a rotational driving member 128 which supplies power for rotating the rotational storage units 120 about the support shaft 127.

The rotational driving member 128 may include a drive motor, a driving gear for transferring rotation of the drive gear, and a driven gear engaging with the driving gear and coupled to each of the rotational storage units 120.

However, the rotational driving member 128 is not limited to this configuration. Alternatively, power from the drive motor may be transferred to rotate the rotational storage units 120 via various devices, such as a pulley and a belt, a gear and a chain, and the like.

The elevation unit 130 is disposed at one peripheral side of the rotational storage units 120 to lift or lower bicycles loaded thereon. The elevation unit 130 includes a carrying board 132 on which a bicycle is loaded, a guide member 134 extending in a vertical direction to guide the carrying board 132 to move in the vertical direction, and an elevation power transfer member 135 connected to the carrying board 132 and supplying power for moving the carrying board 132 along the guide member 134 in the vertical direction.

The carrying board 132 has a guide groove 132a formed on the bottom thereof to guide wheels of a bicycle, and the guide member 134 may be constituted by a pair of guide members facing each other at both sides of the carrying board 132.

Further, the elevation power transfer member 135 is constituted by an elevation motor, pulleys rotated by power from the elevation motor and provided to respective ends of the pair of guide members 134, and a belt connecting the belts to each other and connected to the carrying board 132 to raise of lower the carrying board 132.

However, the elevation power transfer member 135 is not limited to this configuration and may be realized in various ways which can raise of lower the carrying board 132 using power from the elevation motor.

The plural rotational storage units 120 are arranged around the elevation unit 130, which is provided with a storage direction changing unit 140 for rotating the elevation unit 130 to change a storage direction of bicycles.

The storage direction changing unit 140 includes a plate 142 which supports the elevation unit 130, a support column 144 to which the plate 142 is rotatably coupled and which supports the plate 142 with respect to the case 110, and a rotational power transfer member 145 which supplies power for rotating the plate 142 on the support column 144.

In other words, as shown in FIG. 3 or FIG. 4, the plate 142 is provided to a lower portion of the elevation unit 130 and is rotatably coupled to the support column 144. Then, the entirety of the elevation unit 130 is rotated by the rotational power transfer member 145.

The rotational power transfer member 145 has the same configuration as that of the rotational driving member 128 which serves to rotate the rotational storage units 120, and a repeated description thereof will thus be omitted herein.

The apparatus further includes a holding unit 160 on the ground in front of the elevation unit 130 to hold a bicycle to be loaded to or unloaded from the apparatus.

The holding unit 160 includes a base 162, holding grippers 164 provided to the base 162 to compress and secure the rear wheel of the bicycle at both sides of the rear wheel, and a receiving hole 166 formed on the base 162 to partially receive the front wheel of the bicycle.

The holding grippers 164 are located at both sides of the rear wheel of the bicycle and separated from each other to allow the rear wheel of the bicycle to pass therebetween. The holding grippers compress the rear wheel of the bicycle at both sides thereof using force from an air cylinder to hold the bicycle.

Further, a cover member 165 is disposed below the receiving hole 166.

The cover member 165 is lifted or lowered by the air cylinder to open or close the receiving hole 166 such that the rear wheel of the bicycle can be prevented from falling into the receiving hole 166 when the bicycle is loaded or unloaded by the loading/unloading unit 150 described below.

The elevation unit 130 is provided with the loading/unloading unit 150 which loads a bicycle from outside into the elevation unit 130 or unloads a bicycle from the elevation unit 130 to the outside.

The loading/unloading unit 150 includes a transfer bracket 152 coupled to the carrying board to move horizontally on the elevation unit 130, a slide driving unit 154 supplying power for horizontally moving the transfer bracket 152 on the elevation unit 130, a pair of grippers 156 coupled to the transfer bracket 152 to move in a width direction of the transfer bracket 152, and a grip driving unit 158 providing compressive force to cause the pair of grippers 156 to move in the width direction of the transfer bracket 152 to selectively compress the bicycle at both sides thereof.

In other words, the transfer bracket 152 is slidably coupled to the carrying board 132 of the elevation unit 130 via LM guides 155 and transfers power to the transfer bracket 152 via the slide driving unit 154 constituted by a drive motor, a pulley and a belt, such that the transfer bracket 152 can be horizontally moved.

The slide driving unit 154 is not limited to the drive motor, the pulley and the belt and may be realized in various other ways using gears or chains, which can transfer power of the drive motor to the transfer bracket 152.

The grippers 156 are coupled to the transfer bracket 152 via guide rods 159 so as to move in front of the transfer bracket 152 in the width direction, and is forced to compress and grip both sides of the bicycle by the grip driving unit 158, which includes a screw having threads formed at opposite ends thereof in opposite directions and a drive motor for rotating the screw.

The grip driving unit 158 may be driven by an air cylinder provided to each of the grippers 156, or may be realized in various other ways.

Each of the rotational storage units 120 is provided with a securing unit 170 which secures a bicycle to be stored in the corresponding rotational storage unit 120.

The securing unit 170 includes a guide rail 172 disposed on the bottom of each of the rotational storage units 120 constituted by multiple layers to guide the wheel of the bicycle, and a holder 175 provided to the guide rail 172 to selectively compress the wheel of the bicycle at both sides of the wheel.

Each of the rotational storage units 120 is further provided at the center thereof with a guide 171 which comes into contact with both sides of the rear wheel of the bicycle to keep the bicycle upright.

The holder 175 includes a pair of hinge brackets 176 longitudinally separated from each other and hingeably coupled to opposite sides of the guide rail 172 to be symmetrical to each other, a support roller 177 rotatably coupled to each end of the hinge brackets 176 to connect the pair of hinge brackets 176, and a tension spring 178 connecting the hinge brackets 176 to each other to maintain an initial state of the hinge brackets 176 symmetrically disposed at the opposite sides of the guide rail 172.

In other words, the holder 175 compresses the front wheel of the bicycle at both sides of the front wheel to keep the bicycle upright on the rotational storage unit 120 together with the guide 171.

More specifically, referring to FIG. 9 to FIG. 11, the hinge brackets 176 initially have an "L" shape and are disposed symmetrically at the opposite sides of the guide rail 172. The hinge brackets 176 support the bicycle moving along the guide rail 172. Then, when the rear wheel of the bicycle is secured by the guide 171 and the elevation unit 130 descends, the front wheel of the bicycle rotates the hinge brackets 176, so that the support rollers 177 provided to the respective ends of the hinge brackets 176 compress both sides of the front wheel and secure the bicycle.

When the front wheel is raised a predetermined height by the elevation unit 130, each of the hinge brackets 176 is restored into an initial state of the "L" shape by the tension spring 178.

Further, each of the elevation unit 130 and the rotational storage units 120 is provided with a double receiving prevention unit 180 which prevents each of the partitioned bicycle storing sections of the rotational storage unit 120 from receiving two bicycles when a certain bicycle are supplied from the elevation unit 130 to the rotational storage unit 120.

The double receiving prevention unit 180 includes a mirror reflection sensor 182 provided to the elevation unit 130, and a reflection mirror 184 provided to the rotational storage unit 120 and disposed to face the mirror reflection sensor 182

The mirror reflection sensor 182 is disposed in the guide groove 132*a* of the carrying board 132 of the elevation unit 130 and the reflection mirror 184 is placed at the rear of the guide rail 172 such that the presence of a bicycle in the corresponding bicycle storing section of the rotational storage unit 120 can be detected according to whether a signal sent from the mirror reflection sensor 182 is blocked or not by the wheel of the bicycle.

The mirror reflection sensor 182 is disposed at a lower side of the guide groove 132*a* so as not to interfere with the wheel of the bicycle loaded on the carrying board 132 and is collinear with the reflection mirror 184 provided to the guide rail 172.

In other words, when a signal sent from the mirror reflection sensor 182 is blocked by the wheel of the bicycle, it is determined that a certain bicycle has been stored in the corresponding bicycle storing section of the rotational storage unit 120, thereby preventing the corresponding bicycle storing section of the rotational storage unit 120 from receiving another bicycle.

Figure 14:
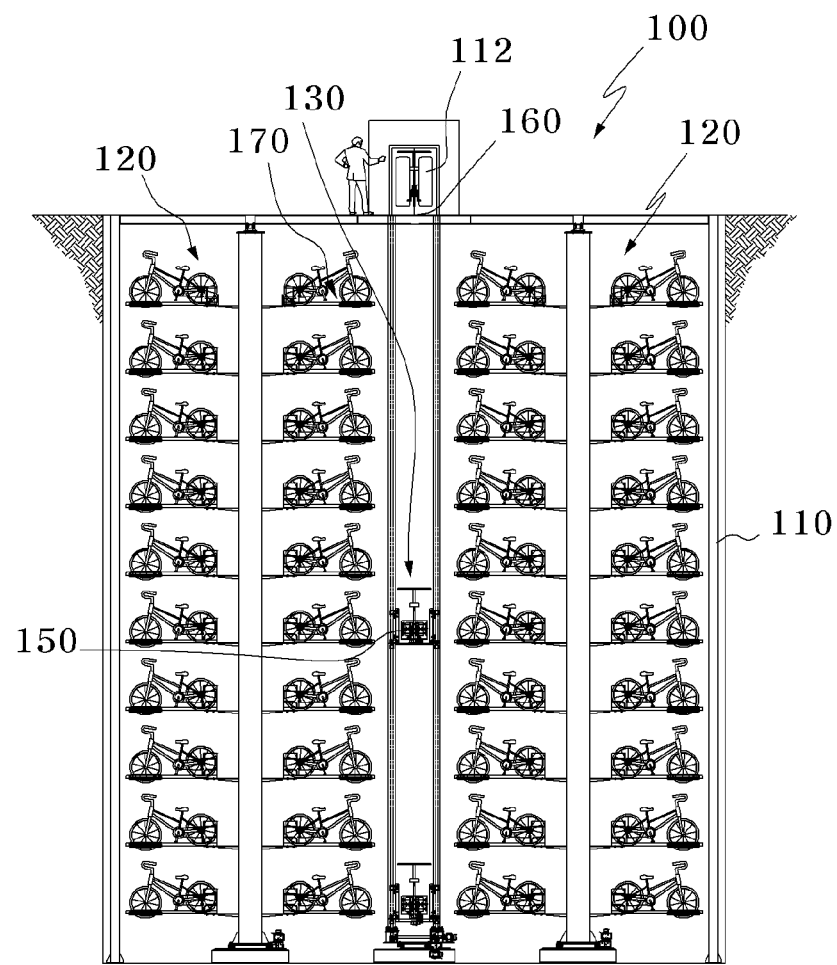
FIG. 14 to FIG. 16 are views of bicycle parking apparatuses according to other exemplary embodiments of the present invention.
Figure 15:
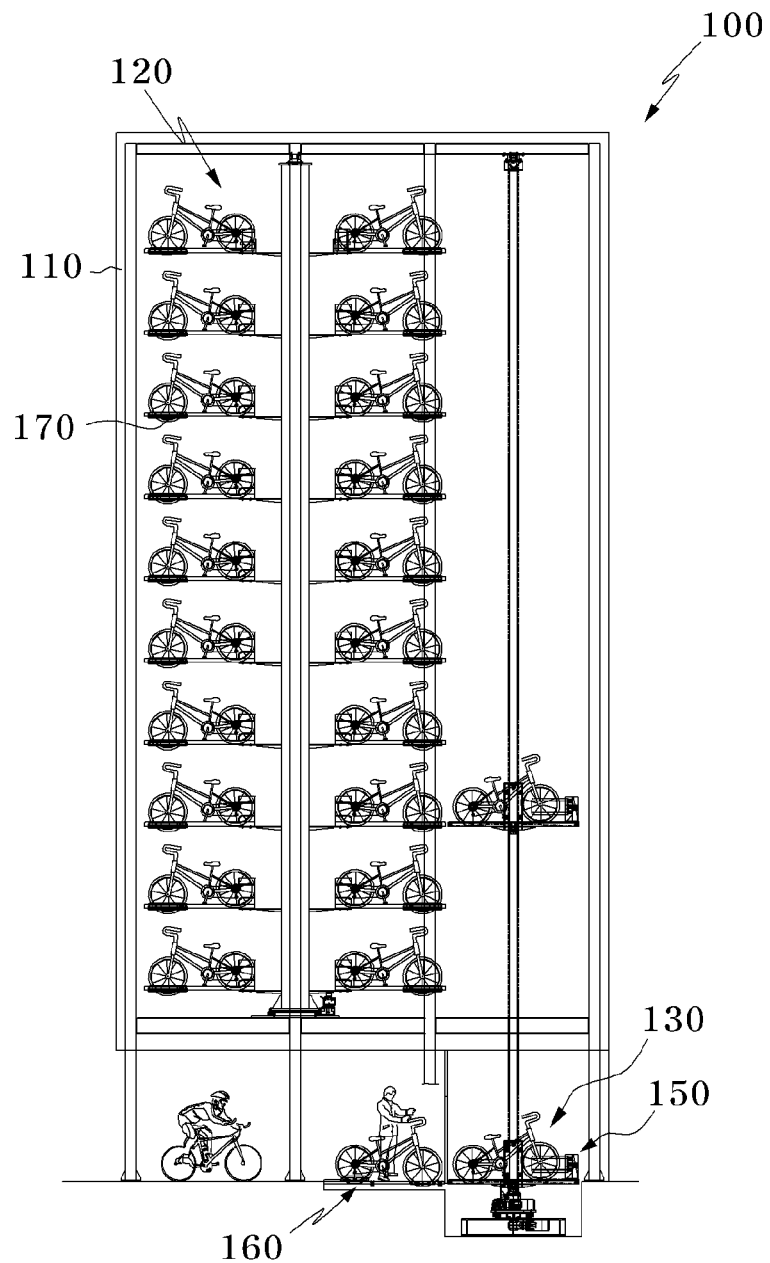
Figure 16:
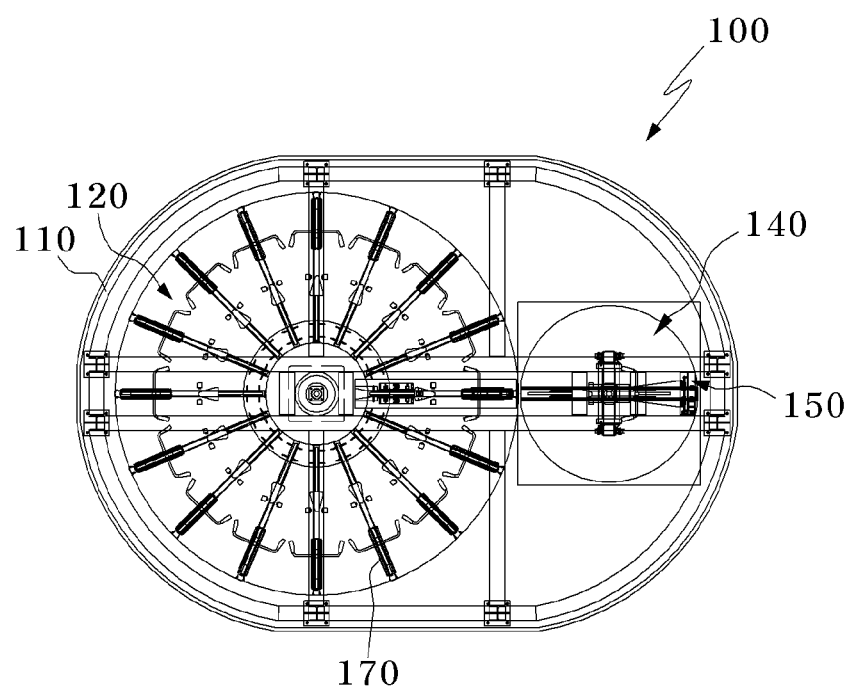

FIG. 14 to FIG. 16 are views of bicycle parking apparatuses according to other exemplary embodiments of the present invention For convenience of description, the same elements as those of the above embodiment will be denoted by the same reference numerals and detailed descriptions thereof will be omitted herein.

Referring to FIG. 14, the case 110 is buried under the ground instead of being built on the ground, and includes rotational storage units 120 and an elevation unit 130.

Further, FIGS. 15 and 16 show a bicycle parking apparatus, which may be applied to store a small number of bicycles and includes one rotational storage unit 120 and an elevation unit 130 for loading or unloading bicycles.

In this embodiment, since the apparatus includes one rotational storage unit 120, the storage direction changing unit 140 may be eliminated from the elevation unit 130.

Next, operation and advantageous effects of the bicycle parking apparatus according to the exemplary embodiment of the invention will be described.

A user places a bicycle on the holding unit 160 located in front of the elevation unit 130 such that the holding unit 160 can hold the bicycle.

As the bicycle is moved along the guide groove 162*a* formed on the base 162, the front wheel of the bicycle is partially received in the receiving hole 166 such that the bicycle stands upright, and the rear wheel of the bicycle is compressed by the holding grippers 164, which are compressed by the air cylinder, so that the bicycle can be held by the holding unit.

Then, when a user operates the bicycle parking apparatus 100 to load the bicycle, the door of the inlet/outlet section 112 of the elevation unit 130 is opened and the bicycle is loaded on the carrying board 132 of the elevation unit 130 by the loading/unloading unit 150, which slides on the elevation unit 130 and grips the bicycle.

Referring to FIG. 12, operation of loading the bicycle will be described in more detail. In this operation, when the transfer bracket 152 is moved towards the holding unit 160 by the slide driving unit 154, and the grippers 156 disposed in front of the transfer bracket 152 are driven to grip the bicycle by the grip driving unit 158, the transfer bracket 152 places the bicycle on the carrying board 132 while moving towards the carrying board 132.

Here, the elevation unit 130 is lifted a predetermined height so as to raise the front wheel of the bicycle received in the receiving hole 166, thereby preventing movement or rattling of the bicycle received in the receiving hole 166 during the operation of loading the bicycle.

Further, the cover member 165 located below the receiving hole 166 covers the receiving hole 166 to prevent the rear wheel of the bicycle from falling into the receiving hole 166, thereby allowing stable bicycle loading.

When the bicycle is placed on the carrying board 132, the carrying board 132 is moved to a desired position through operation of the elevation unit 130.

As soon as the carrying board 132 is moved, the rotational storage unit 120 is rotated by the rotational driving unit 125 such that an available section of the rotational storage unit 120 becomes coincident with the carrying board 132.

Since a plurality of rotational storage units 120 may be arranged around the elevation unit 130, bicycles may be stored in the plural rotational storage units 120 at both sides of the case. Thus, when the rotational storage unit 120 at one side of the case is completely filled with bicycles, the rotational storage unit 120 at the other side of the case may be used to store other bicycles.

This configuration may be allowed since the elevation unit 130 may be changed in position by the storage direction changing unit 140.

As such, when a storing position is set through rotation of the rotational storage unit 120, elevation of the elevation unit 130, and rotation of the storage direction changing unit 140, the loading/unloading unit 150 moves the bicycle from the elevation unit 140 to the rotational storage unit 120, so that the bicycle can be stored therein.

Here, it is possible to prevent each of the bicycle storing sections of the rotational storage unit 130 from storing two bicycles by checking the presence of another bicycle in each of the bicycle storing sections of the rotational storage unit 130 according to whether or not a signal is blocked between the mirror reflection sensor 182 of the elevation unit 130 and the reflection mirror 184 of the rotational storage units 120.

Referring to FIG. 13, in operation of supplying a bicycle to the rotational storage unit 120, as the transfer bracket 152 slides on the carrying board 132 to push the bicycle towards the rotational storage unit, the bicycle is moved towards the rotational storage unit 120 along the guide groove 132a of the carrying board 132 and the guide rail 172 of the rotational storage unit 120.

Then, while moving along the guide rail 172, the rear wheel of the bicycle is securely fitted into the guide 171 at the rear side of the rotational storage unit 120 and the front wheel of the bicycle is seated on the holder 175.

At this time, the elevation unit 130 is lowered by a predetermined distance, so that the front wheel of the bicycle is secured by the holder 175.

Then, the hinge brackets 176 maintained in an "L" shape by the tension spring 178 are rotated by descent of the elevation unit 130, so that the front wheel of the bicycle is fitted into a space in the support roller 177 and compressed at both sides thereof by the support roller 177.

As such, since the bicycle is secured by the guide 171 and the holder 175 in the rotational storage unit 120, the bicycle is stably stored in the rotational storage unit 120 without any movement or rattling upon rotation of the rotational storage unit 120.

When a user wants to unload a bicycle from the bicycle parking apparatus, operation for unloading the bicycle from the bicycle parking apparatus 100 is performed in the reverse sequence to the loading operation described above so that the bicycle is unloaded from the apparatus through the holding unit 160.

As such, according to the embodiments, the bicycle parking apparatus stores bicycles in a radial arrangement in the disk-shaped rotational storage unit 120, so that a large number of bicycles can be stored in a narrow space, thereby minimizing a land area for bicycle parking through optimized storage efficiency.

Further, according to the embodiments of the invention, the bicycle parking apparatus provides user convenience through automation of overall operation for loading or unloading of bicycles, and stores bicycles inside the case 100, thereby preventing damage and burglary of the bicycles.

Although some embodiments have been described herein, it should be understood by those skilled in the art that these embodiments are given by way of illustration only, and that various modifications, variations and alterations can be made without departing from the spirit and scope of the invention. Therefore, the scope of the invention should be limited only by the following claims and equivalents thereof.

The invention claimed is:

1. A bicycle parking apparatus comprising:
a rotational driving unit supplying power;
a rotational storage unit constituted by multiple layers, rotated by power from the rotational driving unit, and partitioned into a plurality of bicycle storing sections to store a plurality of bicycles in a radial arrangement;
an elevation unit disposed at a peripheral side of the rotational storage unit to raise or or lower a bicycle of the plurality of bicycles thereon; and
a loading/unloading unit provided to the elevation unit and holding the bicycle to at least one of load the bicycle from outside onto the elevation unit and to unload the bicycle from the elevation unit to the outside;
wherein the rotational storage unit is provided with a securing unit which secures one of the plurality of bicycles stored therein, the securing unit comprises a guide rail disposed on a bottom of the rotational storage unit to guide a wheel of the bicycle, and a holder provided to the guide rail to selectively compress the wheel of the bicycle at both sides of the wheel;
wherein the holder comprises:
a pair of hinge brackets longitudinally separated from each other and hingably coupled to opposite sides of the guide rail to be symmetrical to each other;
a support roller rotatably coupled to each end of the hinge brackets to connect the pair of hinge brackets; and
a tension spring connecting the hinge brackets to each other to maintain an initial state of the hinge brackets symmetrically disposed at the opposite sides of the guide rail.

2. The apparatus of claim 1, wherein a plurality of rotational storage units is arranged around the elevation unit, and the elevation unit is provided with a storage direction changing unit which rotates the elevation unit to change a storage direction of the bicycle.

3. The apparatus of claim 2, wherein the storage direction changing unit comprises:
a plate supporting the elevation unit;
a support column to which the plate is rotatably coupled and which supports the plate with respect to an outside; and
a rotational power transfer member supplying power for rotating the plate on the support column.

4. The apparatus of claim 1, wherein the elevation unit comprises:
a carrying board on which the bicycle is loaded;
a guide member extending in a vertical direction to guide the carrying board to move in the vertical direction; and
an elevation power transfer member connected to the carrying board and supplying power for moving the carrying board along the guide member in the vertical direction.

5. The apparatus of claim 1, wherein the elevation unit is provided at a front side thereof with a holding unit for holding the bicycle while the bicycle is at least one of loaded on the elevation unit and unloaded therefrom.

6. The apparatus of claim 5, wherein the holding unit comprises a base, a holding gripper provided to the base and compressing a rear wheel of the bicycle to secure the bicycle, and a receiving hole formed on the base to partially receive a front wheel of the bicycle.

7. The apparatus of claim 6, further comprising: a cover member disposed below the receiving hole to selectively cover the receiving hole to prevent the rear wheel of the bicycle from falling into the receiving hole while the bicycle is loaded.

8. The apparatus of claim 1, wherein the loading/unloading unit comprises:
a transfer bracket coupled to the carrying board to move horizontally on the elevation unit;

a slide driving unit supplying power for horizontally moving the transfer bracket on the elevation unit;

a pair of grippers coupled to the transfer bracket to move in a width direction of the transfer bracket; and a grip driving unit providing compressive force to cause the pair of grippers to move in the width direction of the transfer bracket and to selectively compress the bicycle at both sides thereof.

9. The apparatus of claim 1, further comprising:

a double receiving prevention unit in each of the elevation unit and the rotational storage unit to prevent each of the partitioned bicycle storing sections of the rotational storage unit from receiving two bicycles when one of the plurality of bicycles is supplied from the elevation unit into the rotational storage unit.

10. The apparatus of claim 9, wherein the double receiving prevention unit comprises a mirror reflection sensor provided to the elevation unit and a reflection mirror provided to the rotational storage unit and disposed to face the mirror reflection sensor.

* * * * *